(12) United States Patent
Koo et al.

(10) Patent No.: US 11,520,387 B2
(45) Date of Patent: Dec. 6, 2022

(54) ELECTRONIC DEVICE AND METHOD FOR PERFORMING TEMPERATURE CONTROL

(71) Applicant: Samsung Electronics Co., Ltd., Gyeonggi-do (KR)

(72) Inventors: Kyungha Koo, Gyeonggi-do (KR); Kuntak Kim, Gyeonggi-do (KR); Hajoong Yun, Gyeonggi-do (KR); Seungjoo Lee, Gyeonggi-do (KR); Seyoung Jang, Gyeonggi-do (KR); Hyuntae Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 7 days.

(21) Appl. No.: 15/734,060

(22) PCT Filed: Sep. 25, 2020

(86) PCT No.: PCT/KR2020/013109
§ 371 (c)(1),
(2) Date: Dec. 1, 2020

(87) PCT Pub. No.: WO2021/060924
PCT Pub. Date: Apr. 1, 2021

(65) Prior Publication Data
US 2021/0373625 A1  Dec. 2, 2021

(30) Foreign Application Priority Data

Sep. 27, 2019 (KR) .......................... 10-2019-0119952
Sep. 15, 2020 (KR) .......................... 10-2020-0118455

(51) Int. Cl.
*G06F 9/50* (2006.01)
*G06F 1/20* (2006.01)
(Continued)

(52) U.S. Cl.
CPC ............. *G06F 1/206* (2013.01); *G05B 15/02* (2013.01); *G05D 23/1902* (2013.01); *G06F 9/5094* (2013.01)

(58) Field of Classification Search
CPC ....... G06F 1/206; G06F 9/5094; G05B 15/02; G05D 23/1902
See application file for complete search history.

(56) References Cited

U.S. PATENT DOCUMENTS 10,181,305 B2   1/2019   Chae et al.
11,119,517 B2   9/2021   Im et al.
(Continued)

FOREIGN PATENT DOCUMENTS

KR   100651186   11/2006
KR   101894282   2/2013
(Continued)

OTHER PUBLICATIONS

International Search Report dated Jan. 6, 2021 issued in counterpart application No. PCT/KR2020/013109, 11 pages.

*Primary Examiner* — Gary Collins
(74) *Attorney, Agent, or Firm* — The Farrell Law Firm, P.C.

(57) ABSTRACT

An electronic device and method of operating an electronic device are provided. The electronic device includes a temperature measurement unit configured to measure a temperature of each of multiple components of the electronic device, and a controller configured to change, based on a first reference temperature, an operating frequency of the controller to a first operating frequency when a temperature of the controller, measured by the temperature measurement unit, reaches the first reference temperature and change, based on a third reference temperature that is lower than the first reference temperature, the operating frequency of the controller to a second operating frequency when a tempera-
(Continued)

ture of at least one component of the multiple components reaches a second reference temperature while the controller operates at the first operating frequency.

20 Claims, 18 Drawing Sheets

(51) Int. Cl.
  *G05B 15/02* (2006.01)
  *G05D 23/19* (2006.01)

(56) References Cited

U.S. PATENT DOCUMENTS

| | | | | |
|---|---|---|---|---|
| 2004/0104709 | A1* | 6/2004 | Yamaji | H01M 10/443 320/150 |
| 2006/0197740 | A1* | 9/2006 | Xu | G06F 1/206 345/156 |
| 2012/0049933 | A1* | 3/2012 | Riechel | G06F 1/206 327/512 |
| 2013/0027115 | A1 | 1/2013 | Park et al. | |
| 2013/0159744 | A1* | 6/2013 | Gooding | G06F 1/3234 713/320 |
| 2014/0328367 | A1 | 11/2014 | Niederberger et al. | |
| 2015/0006937 | A1* | 1/2015 | Rotem | G06F 1/3215 713/324 |
| 2016/0262253 | A1 | 9/2016 | Isaacs et al. | |
| 2017/0220445 | A1* | 8/2017 | Cunningham | G06F 11/3024 |
| 2018/0181171 | A1* | 6/2018 | Jang | H02J 7/0091 |
| 2019/0286200 | A1* | 9/2019 | Ho | G06F 1/1694 |

FOREIGN PATENT DOCUMENTS

| | | |
|---|---|---|
| KR | 1020150120213 | 10/2015 |
| KR | 1020160026329 | 3/2016 |
| KR | 102325564 | 11/2021 |

* cited by examiner

ELECTRONIC DEVICE AND METHOD FOR PERFORMING TEMPERATURE CONTROL

PRIORITY

This application is a National Phase Entry of PCT International Application No. PCT/KR2020/013109 which was filed on Sep. 25, 2020, and claims priority to Korean Patent Application Nos. 10-2019-0119952 and 10-2020-0118455, which were filed on Sep. 27, 2019 and Sep. 15, 2020, respectively, the content of each of which is incorporated herein by reference.

TECHNICAL FIELD

The present disclosure relates to an electronic device and a method for controlling a temperature.

BACKGROUND ART

An electronic device may perform throttling, which restricts the performance of the electronic device based on the temperature of a component (e.g. a processor) of the electronic device. The electronic device may perform throttling such that the temperature of a component is controlled to remain within a guaranteed temperature or temperature range. The electronic device may restrict the performance thereof by performing throttling.

DISCLOSURE OF INVENTION

Technical Problem

In an electronic device, the guaranteed temperature of a processor may be higher than the guaranteed temperature of other components and/or the temperature of the surface (e.g. a housing) of the electronic device. When the electronic device performs throttling based on the temperature of the processor, the throttling may be performed before the temperature of a component reaches the guaranteed temperature of the component. Thus, the performance of the electronic device may be reduced before the temperature of the component reaches the guaranteed temperature of the component. Therefore, there is a need for a method of delaying the time point of throttling as much as possible so as to maintain the operation performance of an electronic device as high as possible.

Solution to Problem

The present disclosure has been made to address at least the disadvantages described above and to provide at least the advantages described below.

In accordance with an aspect of the present disclosure, an electronic device is provided. The electronic device includes a temperature measurement unit configured to measure a temperature of each of multiple components of the electronic device, and a controller configured to change, based on a first reference temperature, an operating frequency of the controller to a first operating frequency when a temperature of the controller, measured by the temperature measurement unit, reaches the first reference temperature and change, based on a third reference temperature that is lower than the first reference temperature, the operating frequency of the controller to a second operating frequency when a temperature of at least one component of the multiple components reaches a second reference temperature while the controller operates at the first operating frequency.

In accordance with an aspect of the present disclosure, a method of operating an electronic device is provided.

The method includes measuring a temperature of a processor of the electronic device through a first temperature sensor of the electronic device, changing, based on a first reference temperature, an operating frequency of the processor to a first operating frequency when the temperature of the processor reaches the first reference temperature, measuring a temperature of at least one component among multiple components of the electronic device through a second temperature sensor of the electronic device, and changing, based on a third reference temperature lower than the first reference temperature, the operating frequency of the processor to a second operating frequency when the temperature of the at least one component reaches a second reference temperature.

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

It is an aim of certain embodiments of the invention to solve, mitigate or obviate, at least partly, at least one of the problems and/or disadvantages associated with the prior art. Certain embodiments aim to provide at least one of the advantages described below.

Advantageous Effects of Invention

An electronic device and an operation method thereof according to one embodiment can delay a time point of throttling based on the temperature of a component of the electronic device, thereby delaying a time point of reduction of the operation performance of the electronic device.

An electronic device and an operation method thereof according to one embodiment can delay the time point of reduction of the operation performance of the electronic device, thereby maintaining the operation performance of the electronic device as high as possible.

Effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

The above and other aspects, features and advantages of certain embodiments of the disclosure will be more apparent from the following detailed description taken in conjunction with the accompanying drawings, in which.

BEST MODE FOR CARRYING OUT THE INVENTION

Figure 1:
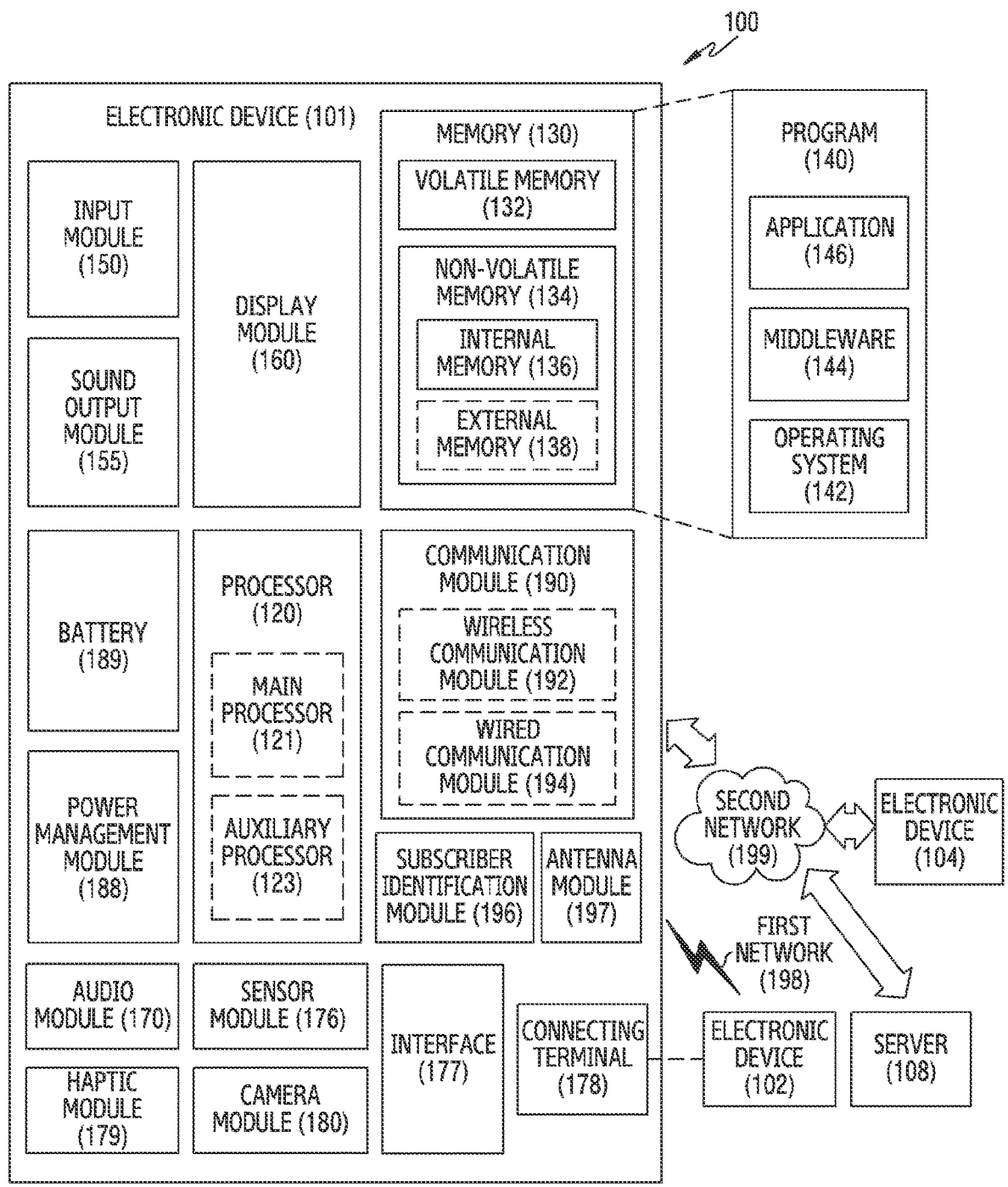
FIG. 1 is a block diagram of an electronic device in a network environment, according to an embodiment.

FIG. 1 is a block diagram illustrating an electronic device 101 in a network environment 100 according to various embodiments; Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The processor 120 may perform temperature control (e.g. throttling) based on the temperature of the processor 120, the temperature of at least one other hardware element of the electronic device 101 connected to the processor 120, or a combination thereof.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine. For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device and an operation method thereof can delay a time point of throttling based on the temperature of a component of the electronic device, thereby delaying a time point of reduction of the operation performance of the electronic device.

An electronic device and an operation method thereof can delay the time point of reduction of the operation performance of the electronic device, thereby maintaining the operation performance of the electronic device as high as possible.

Figure 2A:
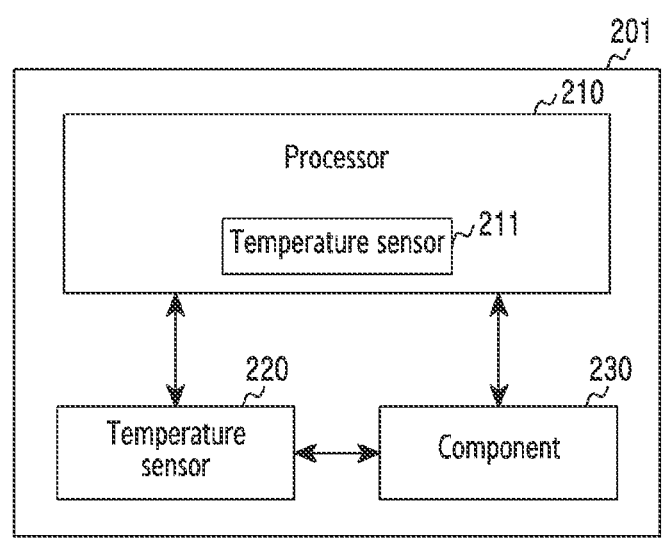
FIG. 2A is a block diagram of an electronic device, according to an embodiment.
Figure 2B:
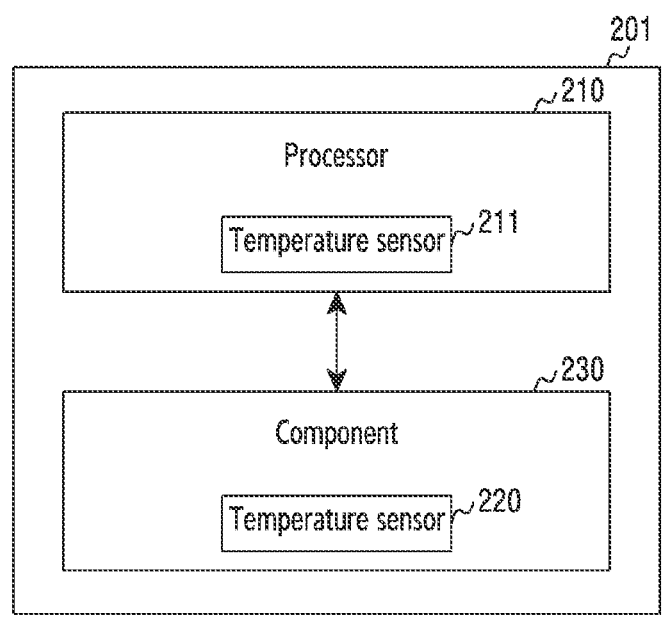
FIG. 2B is a block diagram of an electronic device, according to an embodiment.

FIG. 2A is a block diagram of an electronic device 201, according to an embodiment. FIG. 2B is a block diagram of the electronic device 201, according to an embodiment. When the electronic device 201 in FIG. 2A is compared with the electronic device 201 in FIG. 2B, in the electronic device 201 of FIG. 2A, a temperature sensor 220 and a component 230 may be implemented separately. When the electronic device 201 in FIG. 2B is compared with the electronic device 201 in FIG. 2A, in the electronic device 201 of FIG. 2B, the temperature sensor 220 may be installed in the component 230.

In one embodiment, referring to FIGS. 2A and 2B, the electronic device 201 may include a processor 210, the temperature sensor 220, or the component 230. The processor 210 may include a temperature sensor 211 for measuring the temperature of the processor 210. The temperature sensor 211, the temperature sensor 220, or a combination thereof may be included in the sensor module 176 in FIG. 1. The component 230 may be a component which is predetermined to require temperature management. The component 230 may refer to a specific component which may be damaged by a temperature. The component 230 may correspond to the memory 130, the input module 150, the sound output module 155, the display module 160, the audio module 170, the sensor module 176, the interface 177, the connection terminal 178, the haptic module 179, the camera module 180, the power management module 188, the battery 189, the communication module 190, the subscriber identification module 196, the antenna module 197, or a combination thereof in FIG. 1. The component 230 may correspond to a housing of the electronic device 210. When the component 230 is the housing of the electronic device 210, the temperature of the component 230, measured by the temperature sensor 220, may indicate the surface temperature of the electronic device 210.

The processor 210 may measure the temperature of the processor 210, based on a temperature measurement value input from the temperature sensor 211. The processor 210 may measure the temperature of the component 230 based on a temperature measurement value input from the temperature sensor 211 while measuring the temperature of the processor 210.

The processor 210 may perform a first temperature control of the processor 210 based on the temperature of the processor 210. The temperature control of the processor 210 may be called "throttling".

The processor 210 may perform the first temperature control such that the temperature of the processor 210 is identified as a temperature equal to or lower than a guaranteed upper-limit temperature of the processor 210. The guaranteed upper-limit temperature of the processor 210 may correspond to the highest temperature within the temperature range in which the processor 210 is not damaged by the temperature of the processor 210 (e.g., a guaranteed temperature range for the processor 210).

When the temperature of the processor 210 reaches the guaranteed upper-limit temperature, the processor 210 may reduce its operation performance to a predetermined extent so that the temperature of the processor 210 is within a first temperature range according to the guaranteed upper-limit temperature. Although the operation performance of the processor 210 has been reduced to the predetermined extent, if the temperature of the processor 210 is above the upper-limit temperature of the first temperature range, the processor 210 may additionally reduce its operation performance to a predetermined extent so that the temperature of the processor 210 is within the first temperature range. The processor 210 may compare the temperature of the processor 210 with the upper-limit temperature of the first temperature range in a predetermined period to reduce the operation performance of the processor 210 to the predetermined extent. The period in which the processor 210 reduces its operation performance to the predetermined extent may be configured in advance. The upper-limit temperature of the first temperature range may correspond to a guaranteed upper-limit temperature. The lower-limit temperature of the first temperature range may correspond to a temperature which is lower than the guaranteed upper-limit temperature by a control temperature (e.g., about 5° C.).

The processor 210 may reduce its operation performance by reducing the maximum operating frequency of the processor 210. The processor 210 may reduce its operation performance by reducing the maximum operating frequency of the processor 210 by a predetermined frequency. The maximum operating frequency may be an upper-limit value of an operating frequency predetermined in a frequency range in which the processor 210 can operate. For example, when the frequency range in which the processor 210 can operate is 0 to 2 GHz and the maximum operating frequency is 1.8 GHz, the processor 210 may operate in a frequency range of about 0 to about 1.8 GHz.

The processor 210 may reduce its operation performance by reducing an electric current value input from the processor 210 to the component 230. The processor 210 may reduce its operation performance by reducing the electric current value input from the processor 210 to the component 230 by a predetermined electric current value.

The processor 210 may reduce its operation performance by reducing the maximum operating frequency of the processor 210 and simultaneously reducing the electric current value input to the component 230.

When the temperature of the processor 210 does not reach the lower-limit temperature of the first temperature range, the processor 210 may increase its operation performance to a predetermined extent so that the temperature of the processor 210 is within the first temperature range. When the temperature of the processor 210 does not reach the lower-limit temperature of the first temperature range although the operation performance of the processor 210 has been increased to a predetermined extent, the processor 210 may additionally increase its operation performance to a predetermined extent so that the temperature of the processor 210 is within the first temperature range. The processor 210 may compare the temperature of the processor 210 with the lower-limit temperature of the first temperature range in a predetermined period so as to increase the operation performance of the processor 210 to the predetermined extent.

The processor 210 may increase its operation performance by increasing the operating frequency of the processor 210. The processor 210 may increase its operation performance by increasing the maximum operating frequency of the processor 210 by a predetermined frequency.

The processor 210 may increase its operation performance by increasing an electric current value input from the processor 210 to the component 230. The processor 210 may increase its operation performance by increasing the electric current value input from the processor 210 to the component 230 by a predetermined electric current value.

The processor 210 may increase its operation performance by increasing the maximum operating frequency of the processor 210 and simultaneously increasing the electric current value input to the component 230.

The processor 210 may measure the temperature of the component 230, based on a temperature measurement value input from the temperature sensor 220, while the first temperature control is performed based on the temperature of the processor 210.

The processor 210 may perform second temperature control of the processor 210 based on the temperature of the component 230. By controlling the temperature of the processor 210 based on the temperature of the component 230, the processor 210 may perform the second temperature control such that the temperature of the component 230 is identified as a temperature equal to or lower than a guaranteed upper-limit temperature of the component 230. The guaranteed upper-limit temperature of the component 230 may correspond to the highest temperature within the temperature range in which the component 230 is not damaged by the temperature of the component 230 (e.g., a guaranteed temperature range for the component 230) The second temperature control may restrict the operation performance of the processor 210 more than the first temperature control.

When the temperature of the component 230 exceeds a control reference temperature determined based on a component reference temperature of the component 230, the processor 210 may perform the second temperature control. When the temperature of the component 230 exceeds the control reference temperature while the first temperature control of the processor 210 is being performed, the processor 210 may perform the second temperature control. The control reference temperature determined based on the component reference temperature of the component 230 may be a temperature corresponding to a proportion (e.g., about 90%) configured for a guaranteed upper-limit temperature of the component 230. A proportion configured for the component reference temperature of the component 230 may be determined by an increase rate corresponding to an increase rate (° C./sec) of the temperature of the component 230 over time. The component reference temperature of the component 230 may correspond to the highest temperature (e.g., a guaranteed upper-limit temperature) within the temperature range in which the component 230 is not damaged by the temperature of the component 230.

The second temperature control may be a control performed such that the temperature of the processor 210 is identified within a second temperature range according to the component reference temperature of the component 230. The second temperature range may be lower than the first temperature range. The upper-limit temperature of the second temperature range may correspond to a temperature corresponding to the predetermined proportion of the component reference temperature of the component 230. The lower-limit temperature of the second temperature range may correspond to a temperature which is lower than the upper-limit temperature of the second temperature range by a control temperature (e.g., about 2° C.). When the upper-limit temperature of the second temperature range is about 61° C. and the control temperature is about 2° C., the lower-limit temperature of the second temperature range may be about 59° C.

When the temperature of the processor 210 exceeds the upper-limit temperature of the second temperature range while the second temperature control is performed, the processor 210 may reduce its operation performance to a predetermined extent so that the temperature of the processor 210 is within the second temperature range. Although the operation performance of the processor 210 has been reduced to the predetermined extent, if the temperature of the processor 210 exceeds the upper-limit temperature of the second temperature range, the processor 210 may additionally reduce its operation performance to a predetermined extent so that the temperature of the processor 210 is within the second temperature range. The processor 210 may compare the temperature of the processor 210 with the upper-limit temperature of the second temperature range in a predetermined period to reduce the operation performance of the processor 210 to the predetermined extent. The period in which the processor 210 reduces the operation performance to the predetermined extent may be configured in advance.

The processor 210 may reduce its operation performance by reducing the maximum operating frequency of the processor 210. The processor 210 may reduce its operation performance by reducing the maximum operating frequency of the processor 210 by a predetermined frequency.

The processor 210 may reduce its operation performance by reducing an electric current value input from the processor 210 to the component 230. The processor 210 may reduce its operation performance by reducing the electric current value input from the processor 210 to the component 230 by a predetermined electric current value.

The processor 210 may reduce its operation performance by reducing the maximum operating frequency of the processor 210 and simultaneously reducing the electric current value input to the component 230.

When the temperature of the processor 210 does not reach the lower-limit temperature of the second temperature range while the second temperature control is performed, the processor 210 may increase its operation performance to a predetermined extent so that the temperature of the processor 210 is within the second temperature range. When the temperature of the processor 210 does not reach the lower-limit temperature of the second temperature range even though the operation performance of the processor 210 has been increased to the predetermined extent, the processor 210 may additionally increase its operation performance to the predetermined extent so that the temperature of the processor 210 is within the second temperature range. The processor 210 may compare the temperature of the processor 210 with the lower-limit temperature of the second temperature range in a predetermined period to increase the operation performance of the processor 210 to the predetermined extent.

The processor 210 may increase its operation performance by increasing the maximum operating frequency of the processor 210. The processor 210 may increase its operation performance by increasing the maximum operating frequency of the processor 210 by a predetermined frequency.

The processor 210 may increase its operation performance by increasing an electric current value input from the processor 210 to the component 230. The processor 210 may increase its operation performance by increasing the electric current value input from the processor 210 to the component 230 by a predetermined electric current value.

When temperature control switches from the first temperature control to the second temperature control, the processor 210 may continuously reduce its operation performance until the temperature of the processor 210 is reduced from the first temperature range to the second temperature range.

Figure 3:
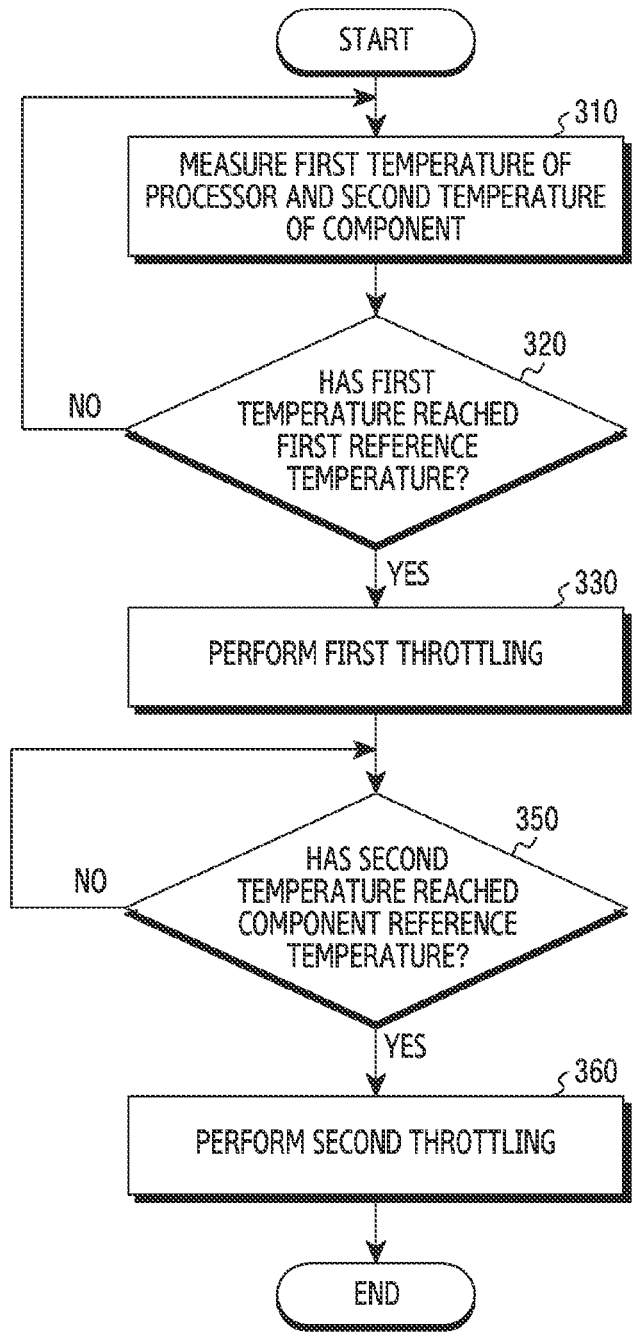
FIG. 3 is a flowchart illustrating an operation of an electronic device, according to an embodiment.
Figure 4A:
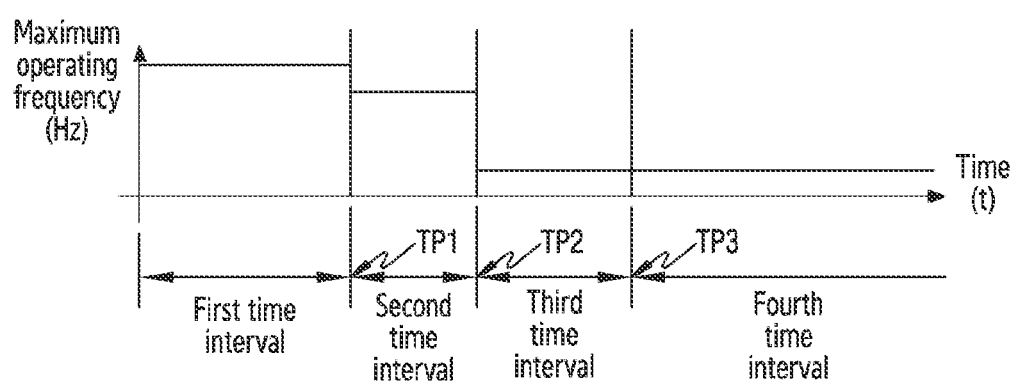
FIG. 4A is a graph showing a change in an operating frequency of a processor of an electronic device, according to an embodiment.
Figure 4B:
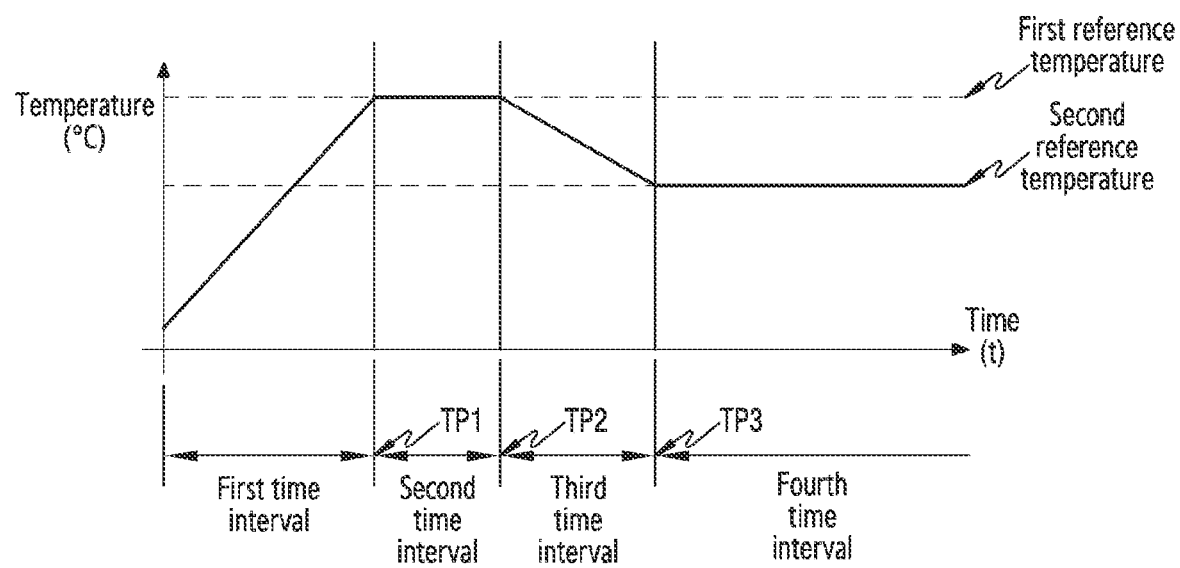
FIG. 4B is a graph showing a change in a temperature of a processor of an electronic device, according to an embodiment.
Figure 4C:
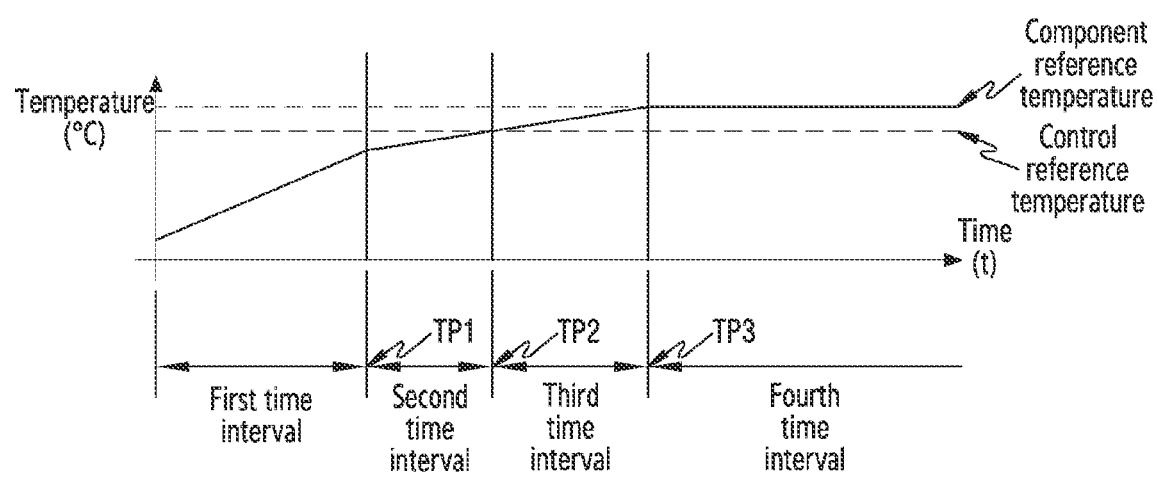
FIG. 4C is a graph showing a change in a temperature of a component of an electronic device, according to an embodiment.

FIG. 3 is a flowchart illustrating an operation of an electronic device, according to an embodiment. FIG. 4A is a graph showing a change in the maximum operating frequency of a processor of the electronic device 201, according to an embodiment. FIG. 4B is a graph showing a change in a temperature of the processor 210 of the electronic device 201, according to an embodiment. FIG. 4C is a graph showing a change in a temperature of a component of the electronic device 201, according to an embodiment. The steps in FIG. 3 may be described with reference to the electronic device 201 in FIG. 2A or 2B. The graphs in FIGS. 4A to 4C may be described with reference to the electronic device 201 in FIG. 2A or 2B.

At step 310, the processor of the electronic device 201 may measure a first temperature of the processor 210 and a second temperature of the component 230. The processor 210 may measure the first temperature of the processor 210, based on a temperature measurement value input from a temperature sensor for the processor 210. The processor 210 may measure the second temperature of the component 230 based on a temperature measurement value input from a temperature sensor for the component 230.

Referring to FIGS. 4A to 4C, in a first time interval before a first time point TP1, the maximum operating frequency of the processor 210 is maintained relatively high, and thus the first temperature of the processor 210 and the second temperature of the component 230 may steadily rise. The maximum operating frequency of the processor 210 in the first time interval may be 2 GHz. Referring to FIGS. 4B and 4C, the temperature increase rate (° C./sec) of the processor 210 may be greater than the temperature increase rate (° C./sec) of the component 230.

At step 320, the processor 210 may determine whether the first temperature of the processor 210 has reached a first reference temperature. The first reference temperature may be a temperature (e.g., a guaranteed temperature of the processor 210) at which the processor 210 is not damaged by the temperature of the processor 210.

When the first temperature of the processor 210 is determined to have reached the first reference temperature ("Yes"), the processor 210 may perform step 330. When it is determined that the first temperature of the processor 210 has not reached the first reference temperature ("No"), the processor 210 may perform step 310.

Referring to FIG. 4B, at the first time point TP1, the first temperature of the processor 210 may reach the first reference temperature.

At step 330, the processor 210 may perform a first throttling. The first throttling of the processor 210 may be an operation of adjusting the performance of the processor 210 such that the first temperature of the processor 210 is within a first temperature range according to the first reference temperature. The upper limit of the first temperature range may correspond to the first reference temperature. The lower limit of the first temperature range may correspond to a temperature which is lower than the first reference temperature by a reference performance control range.

When the temperature of the processor 210 exceeds the upper limit of the first temperature range, the processor 210 may perform the first throttling by reducing the maximum operating frequency of the processor 210. When the temperature of the processor 210 exceeds the upper limit of the first temperature range, the processor 210 may perform the first throttling by limiting the electric current value input from the processor 210 to the component 230. When the temperature of the processor 210 exceeds the upper limit of the first temperature range, the processor 210 may perform the first throttling of by reducing the maximum operating frequency of the processor 210 and simultaneously limiting the electric current value input to the component 230.

When the temperature of the processor 210 does not reach the lower limit of the first temperature range, the processor 210 may perform the first throttling by reducing the maximum operating frequency of the processor 210. When the temperature of the processor 210 does not reach the lower limit of the first temperature range, the processor 210 may perform the first throttling by limiting the electric current value input to the component 230. When the temperature of the processor 210 does not reach the lower limit of the first temperature range, the processor 210 may perform the first throttling by reducing the maximum operating frequency of the processor 210 and simultaneously limiting the electric current value input to the component 230.

Referring to FIGS. 4A and 4B, in a second time interval between the first time point TP1 and a second time point TP2, the processor 210 may perform the first throttling such that the first temperature of the processor 210 is in the first temperature range according to the first reference temperature. Referring to FIG. 4A, in the second time interval, when the processor 210 performs the first throttling, the maximum operating frequency of the processor 210 may be reduced compared with that before the first throttling is performed. The maximum operating frequency of the processor 210 in the second time interval may be lower than the maximum operating frequency of the processor 210 in the first time interval. The maximum operating frequency of the processor 210 in the second time interval may be 1.8 GHz. Referring to FIG. 4B, in the second time interval, when the processor 210 performs the first throttling, the first temperature of the processor 210 may be in the first temperature range according to the first reference temperature. Referring to FIG. 4C, in the second time interval, the second temperature of the component 230 may steadily rise. Referring to FIG. 4C, in the second time interval, the temperature increase rate of the component 230 may be smaller than the temperature increase rate before the first time point.

At step 350, the processor 210 may determine whether the second temperature of the component 230 has reached a control reference temperature. The control reference temperature may correspond to a temperature corresponding to a predetermined proportion (e.g., about 90%) of a component reference temperature (e.g., a guaranteed upper-limit temperature) of the component 230.

When it is determined that the second temperature of the component 230 has reached the control reference temperature ("Yes"), the processor 210 may perform step 360. When it is determined that the second temperature of the component 230 has not reached the control reference temperature ("No"), the processor 210 may perform step 340.

Referring to FIG. 4C, at the time point TP2, the second temperature of the component 230 may reach the control reference temperature.

At step 360, the processor 210 may perform a second throttling. The second throttling of the processor 210 may be an operation of adjusting the performance of the processor 210 such that the first temperature of the processor 210 is within a second temperature range according to a second reference temperature. The upper limit of the second temperature range may correspond to the second reference temperature. The lower limit of the second temperature range may correspond to a temperature which is lower than the second reference temperature by the reference performance control range. The second reference temperature may be lower than the first reference temperature.

When the temperature of the processor 210 exceeds the upper limit of the second temperature range, the processor 210 may perform the second throttling by reducing the maximum operating frequency of the processor 210. When the temperature of the processor 210 exceeds the upper limit of the second temperature range, the processor 210 may perform the second throttling by limiting the electric current value input from the processor 210 to the component 230. When the temperature of the processor 210 exceeds the upper limit of the second temperature range, the processor 210 may perform the second throttling by reducing the maximum operating frequency of the processor 210 and simultaneously limiting the electric current value input to the component 230.

When the temperature of the processor 210 does not reach the lower limit of the second temperature range, the processor 210 may perform the second throttling by reducing the maximum operating frequency of the processor 210. When the temperature of the processor 210 does not reach the lower limit of the second temperature range, the processor 210 may perform the second throttling by limiting the electric current value input to the component 230. When the temperature of the processor 210 does not reach the lower limit of the second temperature range, the processor 210 may perform the second throttling by reducing the maximum operating frequency of the processor 210 and simultaneously limiting the electric current value input to the component 230.

Referring to FIGS. 4A and 4B, in a third time interval between the second time point TP2 and a third time point TP3, the processor 210 may perform the second throttling such that the first temperature of the processor 210 falls from the first reference temperature to the second reference temperature. Referring to FIGS. 4A and 4B, in the third time interval, the first temperature of the processor 210 exceeds the upper limit of the second temperature range, and thus an operation of reducing the maximum operating frequency of the processor 210 may be continuously performed. Therefore, the maximum operating frequency of the processor 210 in the third time interval may be lower than the maximum operating frequency of the processor 210 in the second time interval. The maximum operating frequency of the processor 210 in the third time interval may be about 1.5 GHz.

Referring to FIG. 4C, in the third time interval, the second temperature of the component 230 may steadily rise. Referring to FIG. 4C, in the third time interval, the temperature increase rate of the component 230 may be smaller than the temperature increase rate thereof before the second time point.

Referring to FIGS. 4A and 4B, in a fourth time interval after the third time point, the processor 210 may perform the second throttling such that the first temperature of the processor 210 is in a temperature range corresponding to the second reference temperature. Referring to FIGS. 4A and 4B, in the fourth time interval, an operation of reducing the maximum operating frequency of the processor 210 and an operation of increasing the maximum operating frequency of the processor 210 may be alternately performed such that the first temperature of the processor 210 is within the second temperature range. Therefore, the maximum operating frequency of the processor 210 in the fourth time interval may be equal to or lower than the maximum operating frequency of the processor 210 in the third time interval.

Referring to FIG. 4C, in the fourth time interval, the second temperature of the component 230 may be in a temperature range corresponding to a first component reference temperature.

Figure 5A:
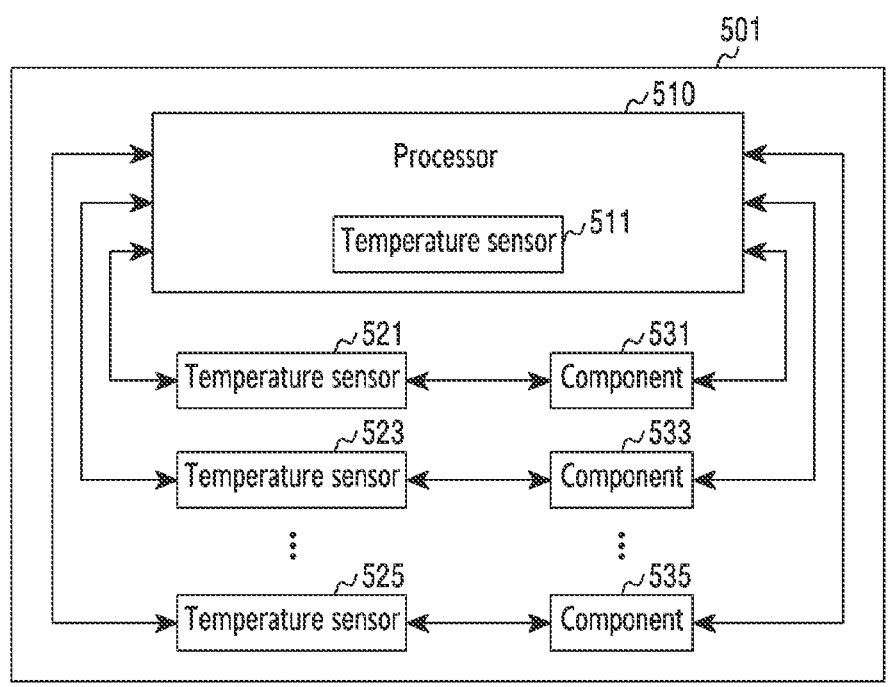
FIG. 5A is a block diagram of an electronic device, according to an embodiment.
Figure 5B:
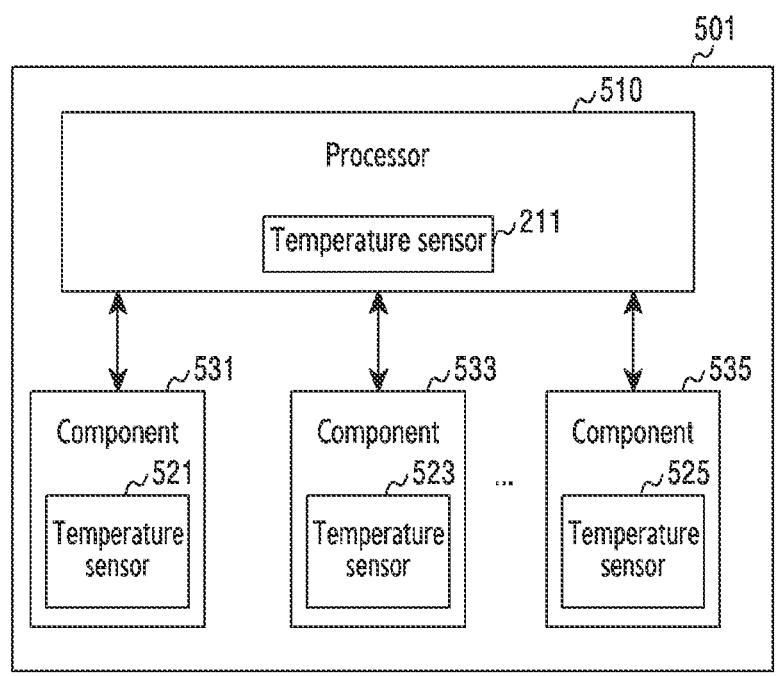
FIG. 5B is a block diagram of an electronic device, according to an embodiment.

FIG. 5A is a block diagram of an electronic device 501, according to an embodiment. FIG. 5B is a block diagram of the electronic device 501, according to an embodiment.

When the electronic device 501 in FIG. 5A is compared with the electronic device 501 in FIG. 5B, in the electronic device 501 in FIG. 5A, at least one temperature sensor 521, 523, or 525 and at least one component 531, 533, or 535 may be implemented separately. When the electronic device 501 in FIG. 5B is compared with the electronic device 501 in FIG. 5A, in the electronic device 501 in FIG. 5B, at least one temperature sensor 521, 523, or 525 may be embedded in at least one component 531, 533, or 535, respectively.

Referring to FIGS. 5A and 5B, the electronic device 501 may include a processor 510, at least one temperature sensor 521, 523, or 525, or at least one component 531, 533, or 535. The processor 510 may include a temperature sensor 511 for measuring the temperature of the processor 510. The temperature sensor 511, the at least one temperature sensor 521, 523, or 525, or a combination thereof may be included in the sensor module 176 in FIG. 1. The at least one component 531, 533, or 535 may refer to a predetermined component which may be damaged by a temperature. The at least one component 531, 533, or 535 may correspond to the memory 130, the input module 150, the sound output module 155, the display module 160, the audio module 170, the sensor module 176, the interface 177, the connection terminal 178, the haptic module 179, the camera module 180, the power management module 188, the battery 189, the communication module 190, the subscriber identification module 196, the antenna module 197, or a combination thereof in FIG. 1. The at least one component 531, 533, or 535 may correspond to a housing of the electronic device 501. When the at least one component 531, 533, or 535 may correspond to the housing of the electronic device 501, the temperature of the at least one component 531, 533, or 535, which is measured by the at least one temperature sensor 521, 523, or 525, may refer to the surface temperature of the electronic device 501. The at least one component 531, 533, or 535 may refer to different components.

The processor 510 may measure the temperature of the processor 510 based on a temperature measurement value input by the temperature sensor 511. The processor 510 may measure the temperature of the at least one component 531, 533, or 535, based on a temperature measurement value input by the at least one temperature sensor 521, 523, or 525 while the temperature of the processor 510 is measured.

The processor 510 may perform first temperature control of the processor 510 based on the temperature of the processor 510. The temperature control of the processor 510 may also be referred to as "throttling".

The processor 510 may perform the first temperature control such that the temperature of the processor 510 is identified as a temperature equal to or less than a guaranteed upper-limit temperature of the processor 510. The guaranteed upper-limit temperature of the processor 510 may correspond to the highest temperature within the temperature range in which the processor 510 is not damaged by the temperature of the processor 510 (e.g., a guaranteed temperature range for the processor 510).

The processor 510 may measure the temperatures of the components 531, 533, and 535, based on temperature measurement values input by the temperature sensors 521, 523, and 525 while the first temperature control is performed based on the temperature of the processor 510.

The processor 510 may perform a second temperature control based on the temperatures of the components 531, 533, and 535. By controlling the temperature of the processor 510 based on the temperatures of the components 531, 533, and 535, the processor 510 may perform the second temperature control such that the temperature of each of the components 531, 533, and 535 is identified as a temperature equal to or less than the guaranteed temperature of each of the components 531, 533, and 535. The second temperature control may restrict the operation performance of the processor 510 more than the first temperature control.

The processor 510 may perform the second temperature control when the temperature of at least one component among the components 531, 533, and 535 exceeds a control reference temperature, which may be determined based on a component reference temperature of the corresponding component.

The processor 510 may apply a weighted value to the temperature of each of the components 531, 533, and 535, and may perform the second temperature control based on the temperature of each of the components 531, 533, and 535, obtained by applying the weighted value. The processor 510 may apply a weighted value to the temperature of each of the components 531, 533, and 535 based on the extent of the effect on the temperature of a predesignated component (e.g., the housing) among the components 531, 533, and 535. The extent of the effect on the temperature of the predesignated component (e.g., the housing) may be in proportion to a correlation between the temperature and/or temperature increase rate of a specific component among the components 531, 533, and 535 and the temperature and/or temperature increase rate of the predesignated component (e.g., the housing). By applying a weighted value to the temperature of each of the components 531, 533, and 535, the processor 510 may perform the second temperature control before the control reference temperature of the specific component is reached.

The control reference temperature may be configured for each of the components 531, 533, and 535. The control reference temperature of each of the components 531, 533, and 535 may be a temperature corresponding to a proportion (e.g., about 90%) configured for a component reference temperature of each of the components 531, 533, and 535. A proportion configured for the component reference temperature of each of the components 531, 533, and 535 may be determined by an increase rate corresponding to an increase rate (° C./sec) of the temperature of each of the components 531, 533, and 535 over time.

The second temperature control may be performed such that the temperature of the processor 510 is identified within the second temperature range according to a component reference temperature of a component (e.g. the component 531), the temperature of which exceeds the control reference temperature, among the components 531, 533, and 535.

The second temperature range may be configured for the component reference temperature of each of the components 531, 533, and 535. When the temperatures of two or more components among the components 531, 533, and 535 exceed the control reference temperature, the second temperature control may be performed based on a second temperature range, which is the lower temperature range among two or more second temperature ranges. The second temperature range may be lower than the first temperature range.

When the temperature of the component 531 exceeds a control reference temperature determined based on the component reference temperature of the component 531, the processor 510 may perform the second temperature control based on a second temperature range of the component 531. While the second temperature control of the processor 510 is performed based on the second temperature range according to the component 531, when the temperature of the component 533 exceeds a control reference temperature determined based on a component reference temperature of the component 533, the processor 510 may perform the second temperature control based on a second temperature range which is the lower temperature range among the second temperature range according to the component 531 and a second temperature range according to the component 533.

Figure 6:
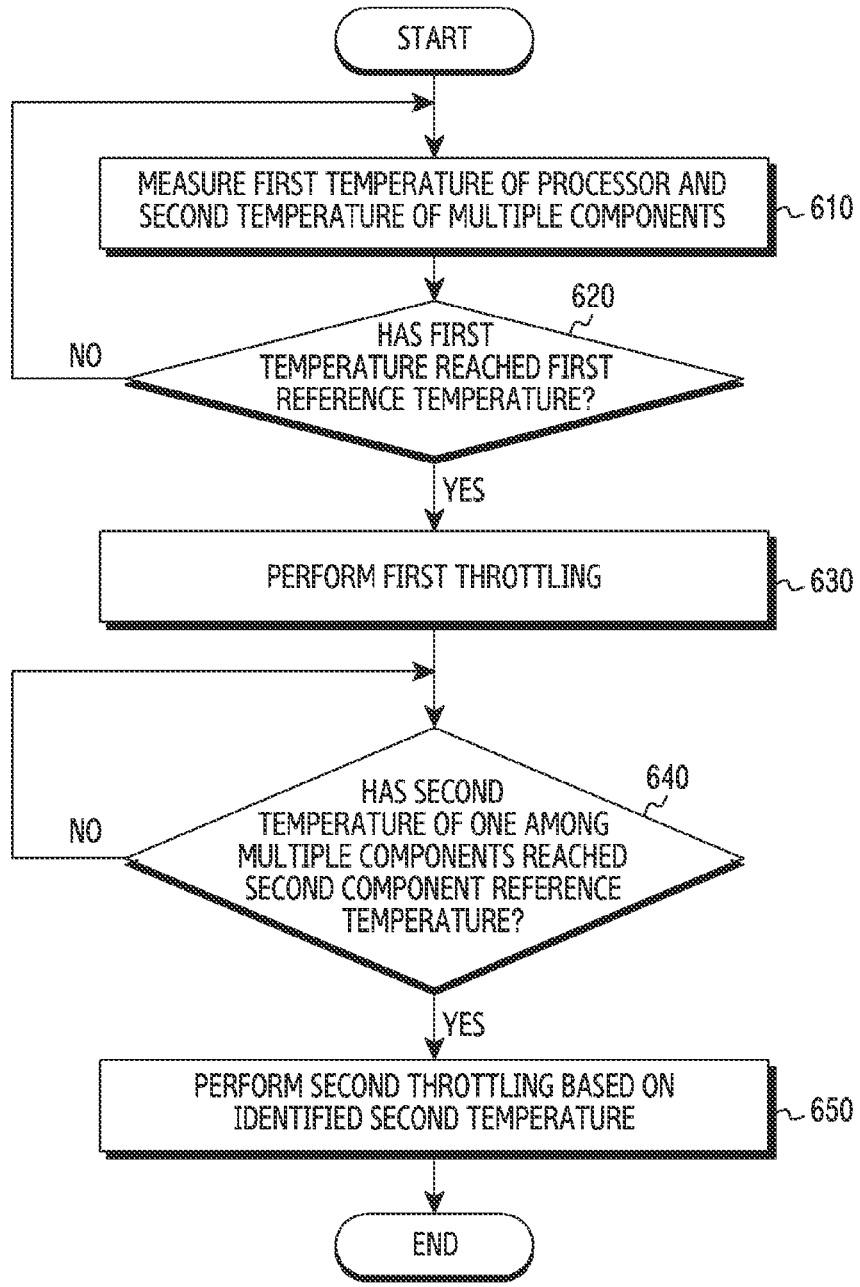
FIG. 6 is a flowchart illustrating an operation of an electronic device, according to an embodiment.
Figure 7A:
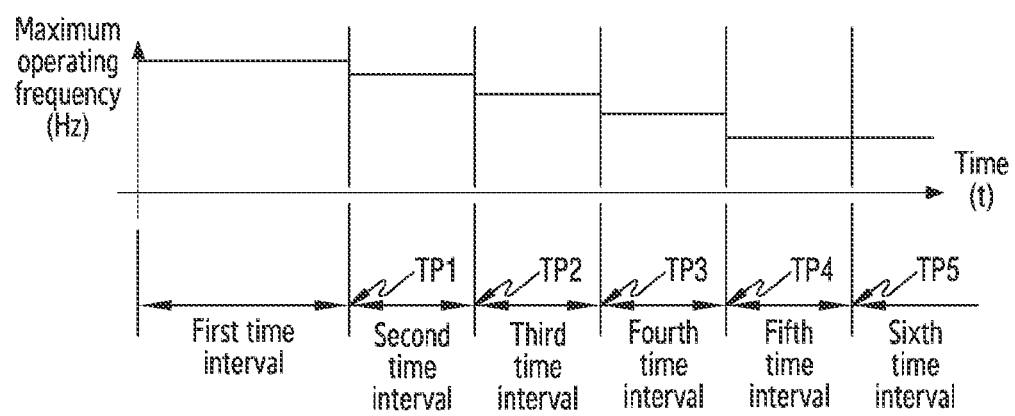
FIG. 7A is a graph showing a change in an operating frequency of a processor of an electronic device, according to an embodiment.
Figure 7B:
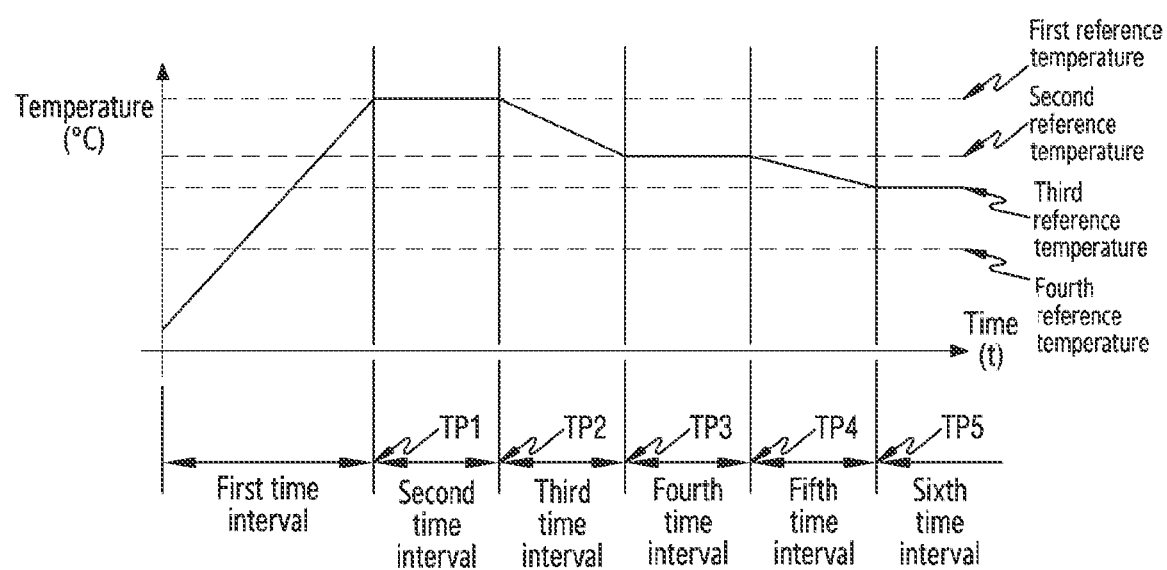
FIG. 7B is a graph showing a change in a temperature of a processor of an electronic device, according to an embodiment.
Figure 7C:
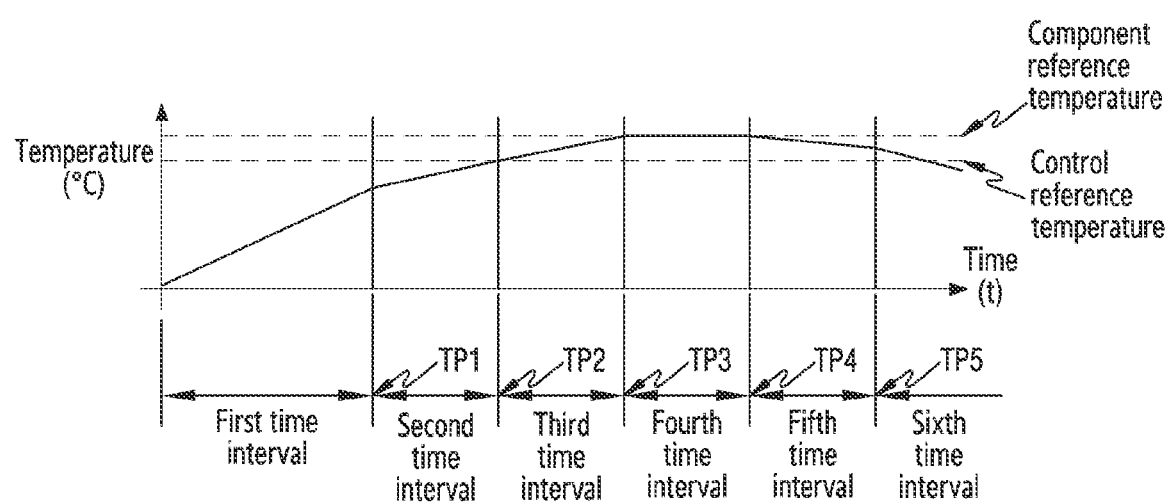
FIG. 7C is a graph showing a change in a temperature of a component of an electronic device, according to an embodiment.
Figure 7D:
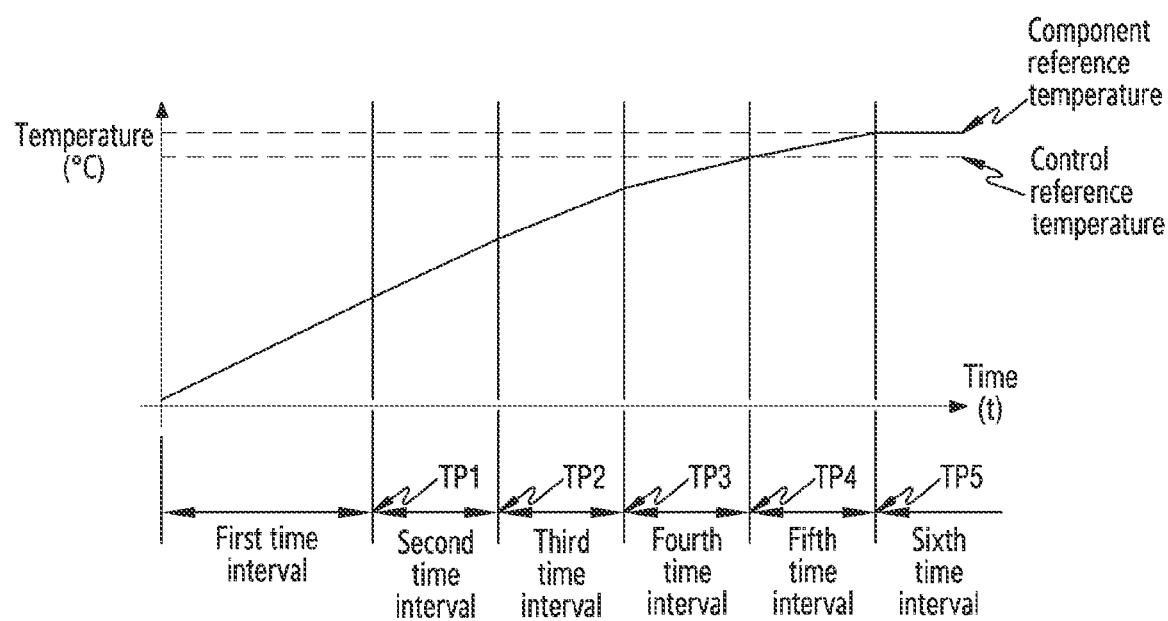
FIG. 7D is a graph showing a change in a temperature of a component of an electronic device, according to an embodiment.
Figure 7E:
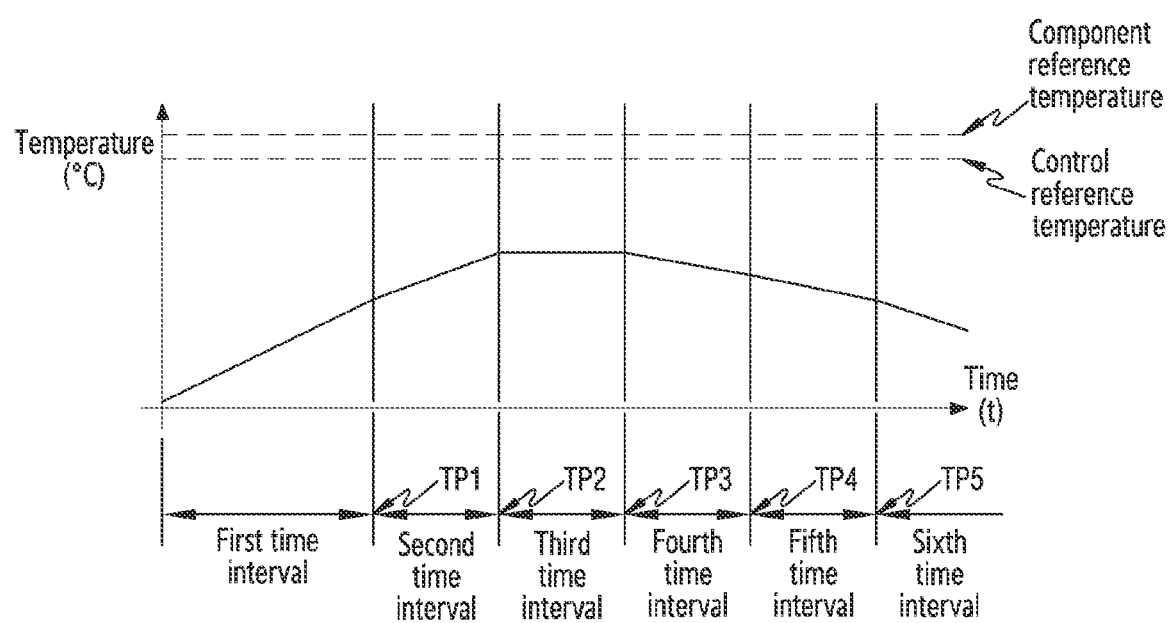
FIG. 7E is a graph showing a change in a temperature of a component of an electronic device, according to an embodiment.

FIG. 6 is a flowchart illustrating an operation of an electronic device, according to an embodiment. FIG. 7A is a graph showing a change in the maximum operating frequency of a processor of the electronic device 501, according to an embodiment. FIG. 7B is a graph showing a change in the temperature of the processor 510 of the electronic device 501, according to an embodiment. FIG. 7C is a graph showing a change in the temperature of the component 531 of the electronic device 501, according to an embodiment. FIG. 7D is a graph showing a change in the temperature of the component 533 of the electronic device 501, according to an embodiment. FIG. 7E is a graph showing a change in the temperature of the component 535 of the electronic device 501, according to an embodiment.

At step 610, the processor of the electronic device 501 may measure a first temperature of the processor 510 and a second temperature of each of the components 531, 533, and 535. The processor 510 may measure the first temperature of the processor 510, based on a temperature measurement value input from a temperature sensor for the processor 510. The processor 510 may measure the second temperatures of the components 531, 533, and 535, based on temperature measurement values input from temperature sensors for the components 531, 533, and 535, respectively.

Referring to FIGS. 7A to 7E, in a first time interval before a first time point TP1, the maximum operating frequency of the processor 510 remains relatively high, and thus the first temperature of the processor 510 and the second temperature of each of the components 531, 533, and 535 may steadily rise. The maximum operating frequency of the processor 510 in the first time interval may be about 2 GHz. Referring to FIGS. 7B and 7C, the temperature increase rate (° C./sec) of the processor 510 may be greater than the temperature increase rate (° C./sec) of each of the components 531, 533, and 535.

At step 620, the processor 510 may determine whether the first temperature of the processor 510 has reached a first reference temperature. The first reference temperature may be a temperature (e.g., a guaranteed temperature of the processor 510) at which the processor 510 is not damaged by the temperature of the processor 510.

When the first temperature of the processor 510 is determined to have reached the first reference temperature ("Yes"), the processor 510 may perform step 630. When it is determined that the first temperature of the processor 510 has not reached the first reference temperature ("No"), the processor 510 may perform step 610.

Referring to FIG. 7B, at the first time point TP1, the first temperature of the processor 510 may reach the first reference temperature.

At step 630, the processor 510 may perform a first throttling. The first throttling of the processor 510 may be an operation of adjusting the performance of the processor 510 such that the first temperature of the processor 510 is within a first temperature range according to the first reference temperature. The upper limit of the first temperature range may correspond to the first reference temperature. The lower limit of the first temperature range may correspond to a temperature which is lower than the first reference temperature by a reference performance control range.

Referring to FIGS. 7A and 7B, in a second time interval between the first time point TP1 and a second time point TP2, the processor 510 may perform the first throttling such that the first temperature of the processor 510 is in the first temperature range according to the first reference temperature. Referring to FIG. 7A, in the second time interval, when the processor 510 performs the first throttling, the maximum operating frequency of the processor 510 may be reduced compared with that before the first throttling is performed. The maximum operating frequency of the processor 510 in the second time interval may be lower than the maximum operating frequency of the processor 510 in the first time interval. The maximum operating frequency of the processor 510 in the second time interval may be about 1.8 GHz. Referring to FIG. 7B, in the second time interval, when the processor 510 performs the first throttling, the first temperature of the processor 510 may be in the first temperature range according to the first reference temperature. Referring to FIGS. 7C to 7E, in the second time interval, the second temperature of each of the components 531, 533, and 535 may steadily rise. Referring to FIGS. 7C to 7E, in the second time interval, the temperature increase rate of each of the components 531, 533, and 535 may be smaller than the temperature increase rate before the first time point.

At step 640, the processor 510 may identify a second temperature, which is one among the second temperatures and has reached a control reference temperature of each of the components 531, 533, and 535 corresponding to the second temperatures. The control reference temperature of each of the components 531, 533, and 535 may correspond to a temperature corresponding to the predetermined proportion (e.g., about 90%) of a component reference temperature of each of the components 531, 533, and 535.

Referring to FIGS. 7C to 7E, at the time point TP2, the second temperature of the component 531 among the components 531, 533, and 535 may reach the control reference temperature.

At step 650, the processor 510 may perform a second throttling. The second throttling of the processor 510 may be an operation of adjusting the performance of the processor 510 such that the first temperature of the processor 510 is within a second temperature range according to a second reference temperature.

Referring to FIGS. 7A and 7B, in a third time interval between the second time point TP2 and a third time point TP3, the processor 510 may perform the second throttling such that the first temperature of the processor 510 falls from the first reference temperature to the second reference temperature. Referring to FIGS. 7A and 7B, in the third time interval, the first temperature of the processor 510 exceeds the upper limit of the second temperature range, and thus an operation of reducing the maximum operating frequency of the processor 510 may be continuously performed. Therefore, the maximum operating frequency of the processor 510 in the third time interval may be lower than the maximum operating frequency of the processor 510 in the second time interval. The maximum operating frequency of the processor 510 in the third time interval may be about 1.5 GHz.

Referring to FIGS. 7C to 7E, in the third time interval, the second temperature of each of the components 531, 533, and 535 may steadily rise. Referring to FIGS. 7C to 7E, in the third time interval, the temperature increase rate of each of the components 531, 533, and 535 may be smaller than the temperature increase rate thereof before the second time point.

Referring to FIGS. 7C to 7E, in a fourth time interval between the third time point TP3 and a fourth time point TP4, the processor 510 may perform the second throttling such that the first temperature of the processor 510 is in a temperature range corresponding to the second reference temperature according to the component reference temperature of the component 531. Referring to FIGS. 7A and 7B, in the fourth time interval, an operation of reducing the maximum operating frequency of the processor 510 and an operation of increasing the maximum operating frequency of the processor 510 may be alternately performed such that the first temperature of the processor 510 is within the second temperature range. Therefore, the maximum operating frequency of the processor 510 in the fourth time interval may be equal to or lower than the maximum operating frequency of the processor 510 in the fourth time interval.

Referring to FIGS. 7C to 7E, at the time point TP4, the second temperature of the component 533 among the components 531, 533, and 535 may reach the control reference temperature.

Referring to FIGS. 7C to 7E, in a fifth time interval between the fourth time point TP4 and a fifth time point TP5, the processor 510 may perform the second throttling such that the first temperature of the processor 510 is in a temperature range which is a lower temperature range among a temperature range corresponding to the second reference temperature according to the component reference temperature of the component 531 and a temperature range corresponding to a third reference temperature according to the component reference temperature of the component 533. Referring to FIGS. 7A and 7B, in the fifth time interval, an operation of reducing the maximum operating frequency of the processor 510 and an operation of increasing the maximum operating frequency of the processor 510 may be alternately performed such that the first temperature of the processor 510 is within the temperature range according to the third reference temperature. Therefore, the maximum operating frequency of the processor 510 in a sixth time interval may be equal to or lower than the maximum operating frequency of the processor 510 in the fifth time interval.

As described above, in an electronic device and an operation method thereof, a processor may delay, as much as possible, a time point of entering throttling based on the temperature of a component so as to delay a time point at which the operation performance of the processor 210 is reduced. As described above, the electronic device and the operation method thereof may delay a time point of reduction of the operation performance of the processor 210 to maintain the operation performance of the processor 210 as high as possible.

An electronic device may include a processor, a first temperature sensor configured to measure the temperature of the processor, a second temperature sensor configured to measure the temperature of each of multiple components of the electronic device, and a memory operationally connected to the processor, where the memory includes instructions which are executed by the processor.

A processor of the electronic device may measure the temperature of the processor through the first temperature sensor.

A processor of the electronic device may change, based on a first reference temperature, the maximum operating frequency of the processor when the temperature of the processor reaches the first reference temperature.

A processor of the electronic device may measure the temperature of at least one component among the multiple components through the second temperature sensor.

A processor of the electronic device may change, based on a third reference temperature lower than the first reference temperature, the maximum operating frequency of the processor when the temperature of the at least one component reaches a second reference temperature.

A processor of the electronic device may determine the first reference temperature, based on a temperature upper-limit value of the processor.

A processor of the electronic device may determine the second reference temperature, based on a temperature upper-limit value of the at least one component.

A processor of the electronic device may determine the third reference temperature, based on the upper-limit temperature value of the at least one component.

A processor of the electronic device may reduce the maximum operating frequency of the processor by a designated frequency when the temperature of the processor reaches a first temperature upper-limit value corresponding to the first reference temperature, in response to arrival of the temperature of the processor at a first reference temperature.

A processor of the electronic device of may increase the maximum operating frequency of the processor by a designated frequency when the temperature of the processor reaches a first temperature lower-limit value corresponding to the first reference temperature.

A processor of the electronic device may reduce the maximum operating frequency of the processor by a designated frequency when the temperature of the processor reaches a second temperature upper-limit value corresponding to the third reference temperature, in response to arrival the temperature of the at least one component at a second reference temperature.

A processor of the electronic device may increase the maximum operating frequency of the processor by a designated frequency when the temperature of the processor reaches a second temperature lower-limit value corresponding to the third reference temperature.

At least one component of the electronic device may be a display, a battery, or a combination thereof.

A processor of the electronic device may measure the temperature of at least one component, which has been activated, among the multiple components through the second temperature sensor, and may identify that the temperature of the at least one activated component reaches a second reference temperature.

A processor of the electronic device may identify components, among the at least one component, that have reached respective second reference temperatures.

A processor of the electronic device of may identify a second reference temperature which is the lowest second reference temperature among the respective second reference temperatures of the identified components, and may change the maximum operating frequency of the processor, based on a third reference temperature corresponding to the identified second reference temperature.

A processor of the electronic device may be integrated with the first temperature sensor.

A processor of the electronic device may be formed integrally with the first temperature sensor in one embodiment.

Figure 8:
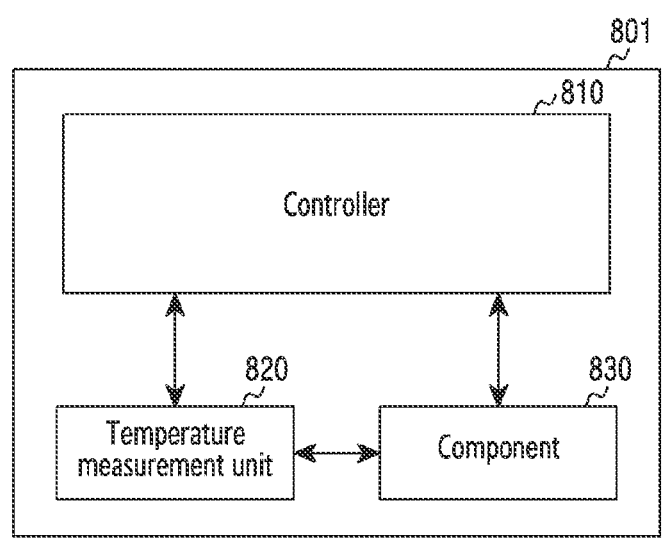
FIG. 8 is a block diagram of an electronic device, according to an embodiment.

FIG. 8 is a block diagram of an electronic device 801, according to an embodiment. The electronic device 801 in FIG. 8 may correspond to the electronic device 101 in FIG. 1. The electronic device 801 in FIG. 8 may correspond to the electronic device 201 in FIG. 2A or 2B. The electronic device 801 in FIG. 8 may correspond to the electronic device 501 in FIG. 5A or 5B.

The electronic device 801 may include a controller 810, a temperature measurement unit 820, a component 830, or a combination thereof. In one embodiment, the controller 810 may correspond to the processor 120 in FIG. 1. The controller 810 in FIG. 8 may correspond to the processor 210 in FIG. 2A or 2B. The controller 810 in FIG. 8 may correspond to the processor 510 in FIG. 5A or 5B.

The temperature measurement unit 820 may be included in the sensor module 176 in FIG. 1. The temperature measurement unit 820 in FIG. 8 may correspond to the temperature sensor 220 in FIG. 2A or 2B. The temperature measurement unit 820 in FIG. 8 may correspond to the temperature sensor 520 in FIG. 5A or 5B.

The component 830 may correspond to the memory 130, the input module 150, the sound output module 155, the display module 160, the audio module 170, the sensor module 176, the interface 177, the connection terminal 178, the haptic module 179, the camera module 180, the power management module 188, the battery 189, the communication module 190, the subscriber identification module 196, or the antenna module 197, or a combination thereof. In one embodiment, the component 830 may correspond to the housing of the processor 210.

The component 830 may correspond to the component 230 in FIG. 2A or 2B. The component 830 may correspond to each of the components 531, 533, and 535 in FIG. 5A or 5B.

Figure 9:
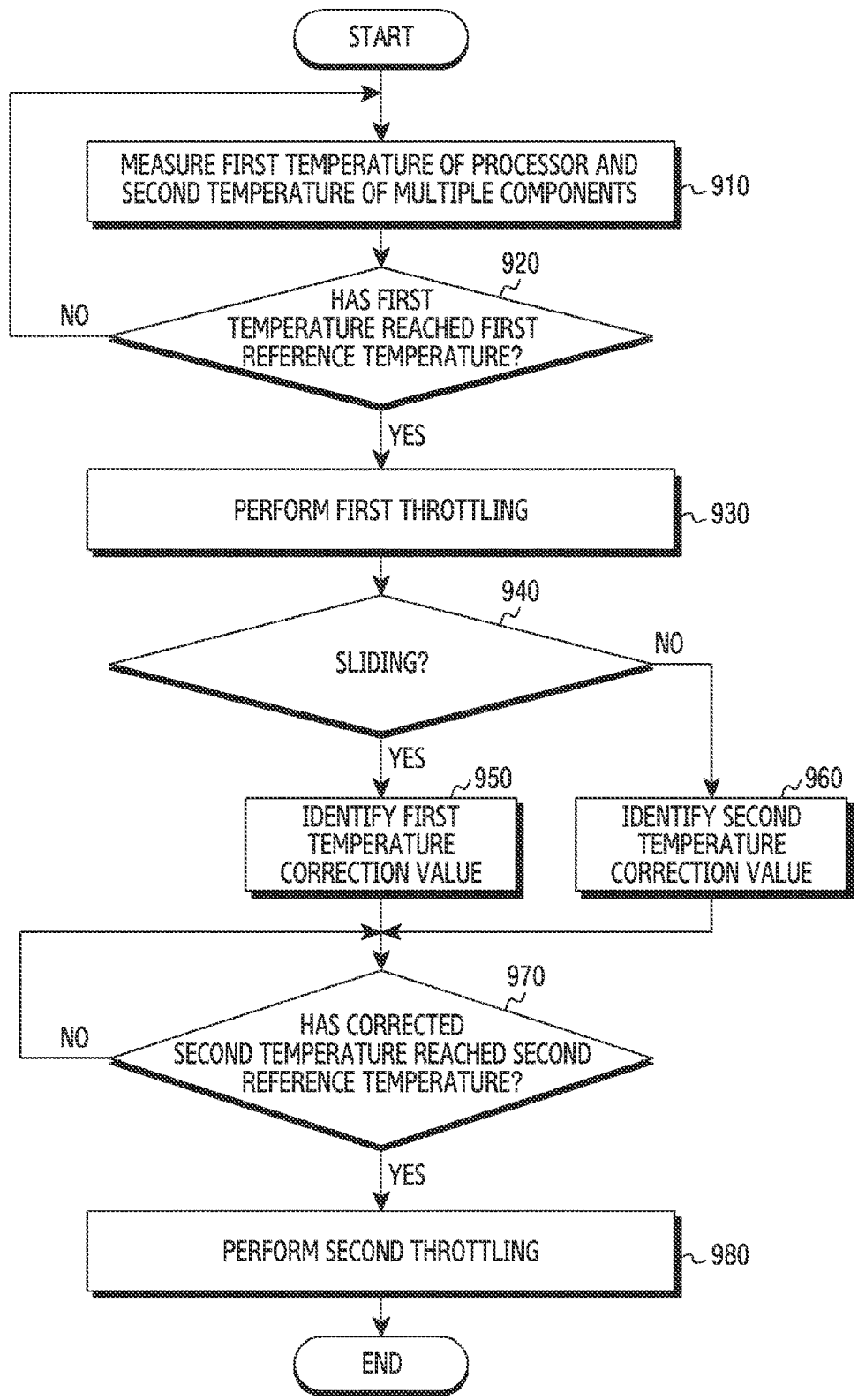
FIG. 9 is a flowchart illustrating operations based on whether an electronic device slides according to one embodiment.
Figure 10:
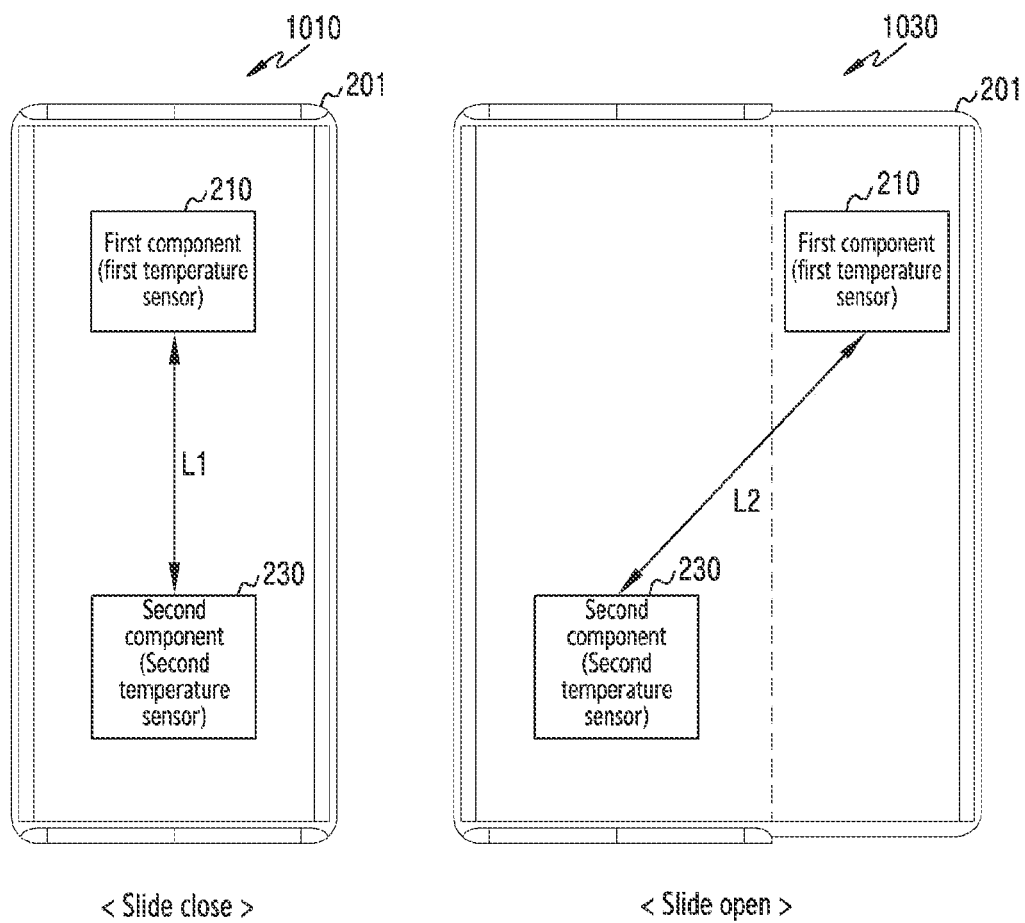
FIG. 10 illustrates a change in the distance between components depending on whether an electronic device slides according to one embodiment.

FIG. 9 is a flowchart illustrating operations based on whether an electronic device (e.g. the electronic device 201 in FIG. 2) slides according to one embodiment. FIG. 10 illustrates a change in the distance between components based on whether an electronic device (e.g. the electronic device 101 in FIG. 2) slides according to one embodiment.

In one embodiment, operations in FIG. 9 may be described with reference to the electronic device 201 in FIG. 2A or 2B.

In one embodiment, in operation 910, a processor (e.g. the processor 210 in FIG. 2) of the electronic device 201 may measure a first temperature of the processor 210 and a second temperature of the component 230. In one embodiment, the processor 210 may measure the first temperature of the processor 210, based on a temperature measurement value input from a temperature sensor (e.g. the temperature sensor 211 in FIG. 2) for the processor 210. In one embodiment, the processor 210 may measure the second temperature of the component 230, based on a temperature measurement value input from a temperature sensor (e.g. the temperature sensor 220 in FIG. 2) for the component 230.

Referring to FIG. 10, the processor 210 (e.g. first component) may measure the first temperature of the processor 210, based on a temperature measurement value input from a temperature sensor (e.g. the temperature sensor 211 in FIG. 2) for the processor 210. In one embodiment, the processor 210 may measure the second temperature of the component 230 (e.g. second component), based on a temperature measurement value input from a temperature sensor (e.g. the temperature sensor 220 in FIG. 2) for the component 230.

In one embodiment, in operation 920, the processor 210 may determine whether the first temperature of the processor 210 has reached a first reference temperature. In one embodiment, the first reference temperature may be a temperature at which the processor 210 is not damaged by the temperature of the processor 210 (e.g. a guaranteed temperature of the processor 210).

In one embodiment, when the first temperature of the processor 210 is determined to have reached the first reference temperature ("Yes"), the processor 210 may perform operation 930. In one embodiment, when the first temperature of the processor 210 is determined to not have reached the first reference temperature ("No"), the processor 210 may perform operation 910.

In one embodiment, in operation 930, the processor 210 may perform first throttling of the processor 210. In one embodiment, operation 930 may correspond to operation 320 in FIG. 3.

In one embodiment, in operation 940, the processor 210 may determine whether the electronic device 201 slides.

Referring to FIG. 10, the processor 210 may determine one state of a non-sliding state 1010 (e.g. slide close) and a sliding state 1030 (e.g. slide open) of the electronic device 201. In one embodiment, the sliding state 1030 may be called an extended state. In one embodiment, the non-sliding state 1010 may be called an unextended state.

In one embodiment, when the state of the electronic device 201 is determined to be the sliding state 1030 ("Yes"), the processor 210 may perform operation 950. In one embodiment, when the state of the electronic device 201 is determined to be the non-sliding state 1010 ("No"), the processor 210 may perform operation 960.

In one embodiment, in operation 950, the processor 210 may identify a first temperature correction value. In one embodiment, the first temperature correction value may be a correction value for correcting the second temperature of the component 230. In one embodiment, the first temperature correction value may be a value predetermined based on a first distance (L1) between the processor 210 and the component 230.

In one embodiment, in operation 960, the processor 210 identify a second temperature correction value. In one embodiment, the second temperature correction value may be a correction value for correcting the second temperature of the component 230. In one embodiment, the second temperature correction value may be a value predetermined based on a second distance (L2) between the processor 210 and the component 230.

In one embodiment, the first temperature correction value and the second temperature correction value may be positive correction values. In one embodiment, the first temperature correction value may be greater than the second temperature correction value. In one embodiment, as the distance between the processor 210 and the component 230 decreases, the temperature correction value may increase. However, in another embodiment, as the distance between the processor 210 and the component 230 decreases, the temperature correction value may decrease. Further, the first temperature correction value may be smaller than the second temperature correction value.

In one embodiment, in operation 970, the processor 210 may determine whether the corrected second temperature of the component 230 has reached a control reference temperature. In one embodiment, the processor 210 may determine, based on the first temperature correction value of the component 230, whether the corrected second temperature has reached the control reference temperature. In one embodiment, the processor 210 may determine, based on the second temperature correction value of the component 230, whether the corrected second temperature has reached the control reference temperature.

In one embodiment, when the corrected second temperature of the component 230 is determined to have reached the control reference temperature ("Yes"), the processor 210 may perform operation 980. In one embodiment, when the corrected second temperature of the component 230 is determined to not have reached the control reference temperature ("No"), the processor 210 may perform operation 970.

In one embodiment, in operation 980, the processor 210 may perform second throttling of the processor 210. In one embodiment, operation 980 may correspond to operation 360 in FIG. 3.

In one embodiment, as described above, an electronic device (e.g. the electronic device 201 in FIG. 2) and an operation method thereof may delay, as long as possible, a time point at which a processor (e.g. the processor 210 in FIG. 2) enters throttling based on the temperature of a component (e.g. the component 230 in FIG. 2), thereby delaying a time point at which the operation performance of the processor 210 is reduced. As described above, an electronic device (e.g. the electronic device 201 in FIG. 2) and an operation method thereof according to one embodiment may delay the time point of the reduction of the operation performance of the processor 210, thereby maintaining the operation performance of the processor 210 as high as possible.

An example provides an electronic device including a component, a temperature measurement unit, and a controller.

The temperature measurement unit (e.g., a temperature sensor) of the electronic device may measure the temperature of each of multiple components of the electronic device.

The controller (e.g., a processor) of the electronic device according to an embodiment may change, based on a first reference temperature, an operating frequency of the controller to a first operating frequency when a temperature of the controller, measured by the temperature measurement unit, reaches the first reference temperature and change, based on a third reference temperature that is lower than the first reference temperature, the operating frequency of the controller to a second operating frequency when a temperature of at least one component of the multiple components reaches a second reference temperature while the controller operates at the first operating frequency.

The component of the electronic device according to an embodiment may be a memory, an input device, a sound output device, a display device, an audio module, a sensor module, an interface, a connection terminal, a haptic module, a camera module, a power management module, a battery, a communication module, a subscriber identification module, an antenna module, or a combination thereof.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a CD-ROM, digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, LAN, WLAN, and storage area network (SAN) or a combination thereof. Such a storage device may access the electronic device via an external port. Further, a separate storage device on the communication network may access a portable electronic device.

The scope of the present disclosure is defined by the attached independent claims. Additional features are specified by the appended dependent claims. Example implementations may be realized by including one or more features taken jointly and individually, from any claim, in any and all permutations.

Examples described in this disclosure include non-limiting example implementations of components corresponding to one or more features, and these features (or their corresponding components), individually or in combination, may contribute to improving one or more technical problems that may be inferred by a person skilled in the art from this disclosure.

In addition, one or more selected components of any one example described in the present disclosure may be combined with one or more selected components of another one or more examples described in the present disclosure, or alternatively, it may be combined with the features of the independent claims that are attached separately to form additional alternative examples.

Additional example implementations include one or more components taken jointly and separately, in any and all permutations, of any herein described implementation. Still other example implementations may also be realized by combining one or more features of the appended claims with selected one or more components of any of the example implementations described in this disclosure.

In forming such additional example implementations, some components of any example implementation described in this disclosure may be omitted. One or more components that may be omitted are components that a person skilled in the art would directly and clearly understand as not so essential to the function of the present technology in light of a technical problem discernible from the present disclosure. A person skilled in the art does not need to modify other components or features of the further alternative example to compensate for the change, even if such omitted components are replaced or removed. Would recognize. Accordingly, further example implementations may be included within the present disclosure, in accordance with the present technology, although a selected combination of features and/or components thereof is not specifically mentioned.

Two or more physically separate components of any described example implementation described in this disclosure may alternatively be integrated into a single component, if their integration is possible, and in a single component so formed. If the same function is performed by means of, the integration is possible. Conversely, a single component of any example implementation described in this disclosure may alternatively be implemented with two or more separate components that achieve the same functionality, where appropriate.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. An electronic device comprising:
    a controller; and
    at least one temperature sensor configured to measure a first temperature of the controller and a second temperature of at least one component of the electronic device different than the controller,
    wherein the controller is configured to:
    change, based on a first reference temperature, an operating frequency of the controller to a first operating frequency when the first temperature of the controller reaches the first reference temperature; and
    change, based on a third reference temperature that is lower than the first reference temperature, the operating frequency of the controller from the first operating frequency to a second operating frequency when the second temperature of the at least one component reaches a second reference temperature while the controller operates at the first operating frequency,
    wherein the second operating frequency used in a second time interval is lower than the first operating frequency used in a first time interval.

2. The electronic device of claim 1, wherein the controller is further configured to determine the first reference temperature, based on a temperature upper-limit value of the controller.

3. The electronic device of claim 1, wherein the controller is further configured to determine the second reference temperature based on a temperature upper-limit value of the at least one component.

4. The electronic device of claim 1, wherein the controller is further configured to determine the third reference temperature, based on the temperature upper-limit value of the at least one component.

5. The electronic device of claim 1, wherein the controller is further configured to, in response to arrival of the first temperature of the controller at the first reference temperature:
    reduce the operating frequency of the controller by a designated frequency when the first temperature of the controller reaches a first temperature upper-limit value corresponding to the first reference temperature, and
    increase the operating frequency of the controller by a designated frequency when the first temperature of the controller reaches a first temperature lower-limit value corresponding to the first reference temperature.

6. The electronic device of claim 1, wherein the controller is further configured to, in response to arrival of the second temperature of the at least one component at the second reference temperature:

reduce the operating frequency of the controller by a designated frequency when the first temperature of the controller reaches a second temperature upper-limit value corresponding to the third reference temperature; and increase the operating frequency of the controller by a designated frequency when the first temperature of the controller reaches a second temperature lower-limit value corresponding to the third reference temperature.

7. The electronic device of claim 1, wherein the at least one component comprises a display, a battery, or a combination thereof.

8. The electronic device of claim 1, wherein:
the at least one temperature sensor is configured to measure a third temperature of at least one activated component; and
the controller is further configured to identify that the third temperature of the at least one activated component reaches a second reference temperature.

9. The electronic device of claim 1, wherein the controller is further configured to:
identify components, among the at least one component, that have reached respective second reference temperatures;
identify a second reference temperature which is a lowest second temperature among the respective second reference temperatures of the identified components; and
change the operating frequency of the controller, based on a third reference temperature corresponding to the identified second reference temperature.

10. A method of operating an electronic device, comprising:
measuring a first temperature of a processor of the electronic device and a second temperature of at least one component of the electronic device different than the processor through at least one temperature sensor of the electronic device;
changing, based on a first reference temperature, an operating frequency of the processor to a first operating frequency when the first temperature of the processor reaches the first reference temperature; and
changing, based on a third reference temperature lower than the first reference temperature, the operating frequency of the processor from the first operating frequency to a second operating frequency when the second temperature of the at least one component reaches a second reference temperature,
wherein the second operating frequency used in a second time interval is lower than the first operating frequency used in a first time interval.

11. The method of claim 10, wherein the first reference temperature is determined based on a temperature upper-limit value of the processor.

12. The method of claim 10, wherein the second reference temperature is determined based on a temperature upper-limit value of the at least one component.

13. The method of claim 10, wherein the third reference temperature is determined based on the temperature upper-limit value of the at least one component.

14. The method of claim 10, wherein changing the operating frequency of the processor to the first operating frequency, based on the first reference temperature, comprises:
in response to arrival of the first temperature of the processor at the first reference temperature,
reducing the operating frequency of the processor by a designated frequency when the first temperature of the processor reaches a first temperature upper-limit value corresponding to the first reference temperature; and
increasing the operating frequency of the processor by a designated frequency when the first temperature of the processor reaches a first temperature lower-limit value corresponding to the first reference temperature.

15. The method of claim 10, wherein changing the operating frequency of the processor to the second operating frequency, based on the third reference temperature, comprises:
in response to arrival of the second temperature of the at least one component at the second reference temperature,
reducing the operating frequency of the processor by a designated frequency when the first temperature of the processor reaches a second temperature upper-limit value corresponding to the third reference temperature; and
increasing the operating frequency of the processor by a designated frequency when the first temperature of the processor reaches a second temperature lower-limit value corresponding to the third reference temperature.

16. The method of claim 10, wherein changing the operating frequency of the processor, based on the third reference temperature, comprises: in response to arrival of the second temperature of the at least one component at the second reference temperature,
reducing the operating frequency of the processor by a designated frequency when the first temperature of the processor reaches a second temperature upper-limit value corresponding to the third reference temperature; and
increasing the operating frequency of the processor by a designated frequency when the first temperature of the processor reaches a second temperature lower-limit value corresponding to the third reference temperature.

17. The method of claim 10, wherein the at least one component comprises a display, a battery, or a combination thereof.

18. The method of claim 10, wherein measuring the second temperature of the at least one component comprises:
measuring a third temperature of at least one activated component through the at least one temperature sensor; and
identifying that the third temperature of the at least one activated component reaches a second reference temperature.

19. The method of claim 10, wherein changing the operating frequency of the processor, based on the third reference temperature, comprises:
identifying components, temperatures of which have reached respective second reference temperatures, among the at least one component;
identifying a lowest second reference temperature among the respective second reference temperatures of the identified components; and
changing the operating frequency of the processor, based on a third reference temperature corresponding to the identified second reference temperature.

20. The method of claim 10, wherein a first temperature sensor of the at least one temperature sensor is formed integrally with the processor.

* * * * *